Patented Mar. 20, 1928.

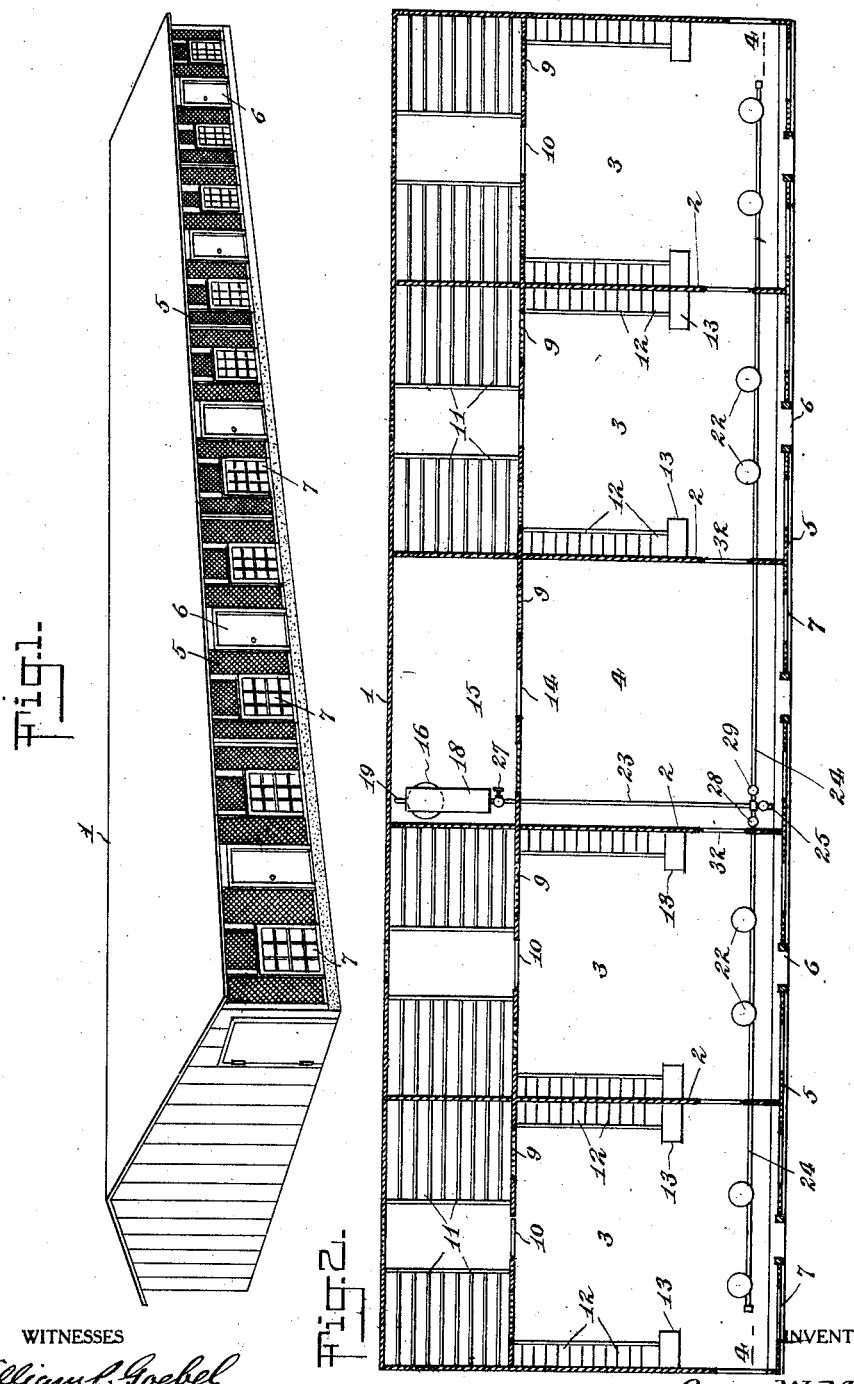

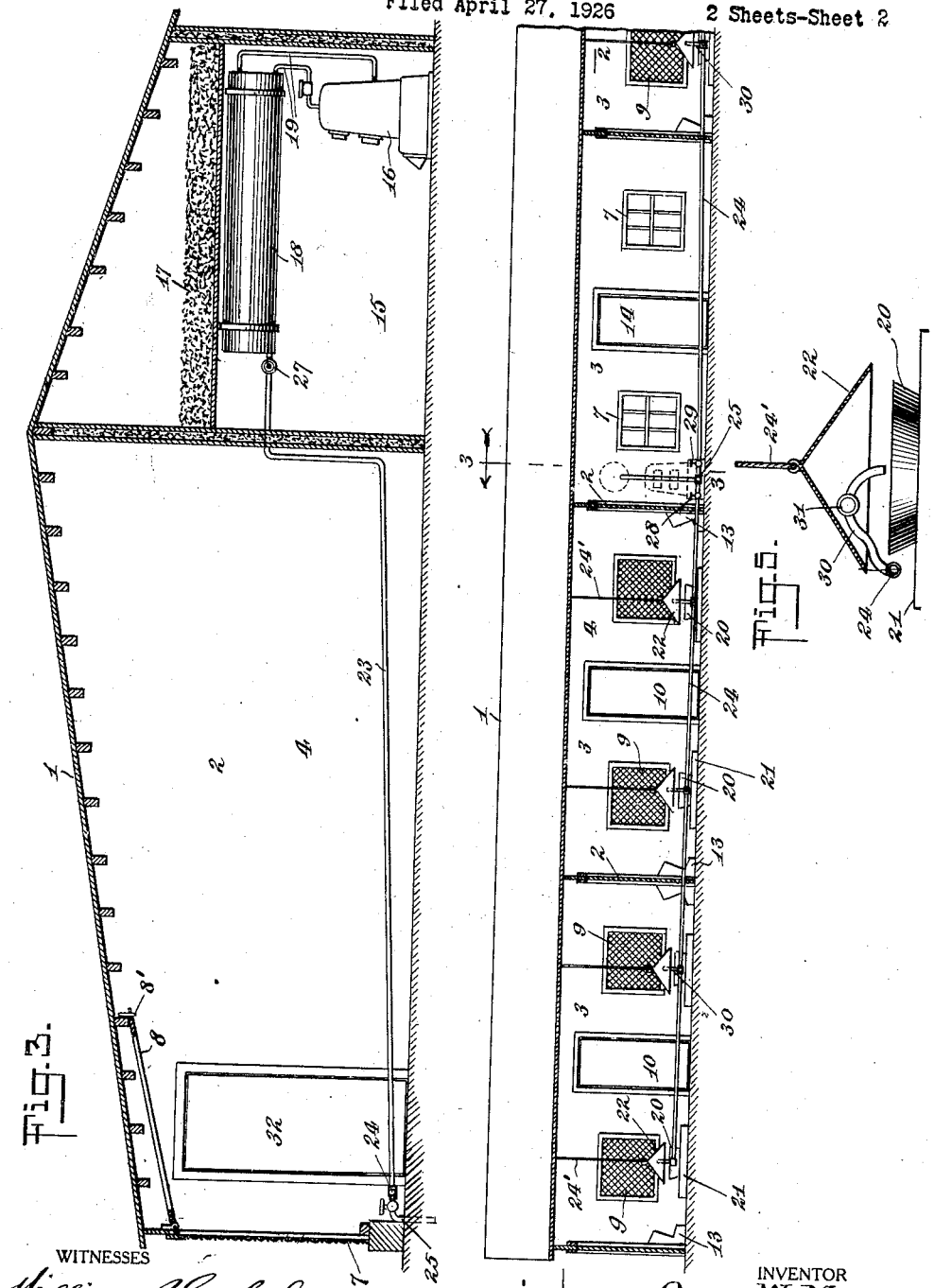

1,663,479

UNITED STATES PATENT OFFICE.

OSCAR W. MAPES, OF MIDDLETOWN, NEW YORK.

EGG FACTORY.

Application filed April 27, 1926. Serial No. 104,983.

This invention relates to egg factories, and I use the word "factory" because the invention includes a building with entire equipment for the care of a sufficient number of hens under one roof, and a suitable room for cleaning, packing and storing eggs under the same roof, so that the feed or raw material is taken in at one door, and the eggs sent out at another, daily, in sufficient quantity to at least fill one thirty-dozen crate, the hens being the operatives.

The house may be of any desired length, preferably with at least twelve compartments for hens and three thousand hens. One man can easily take care of and superintend that many hens in this kind of a house.

An object of the invention is to provide improved means for supplying water to the drinking pans of the house or plant which is especially adapted for use in cold climates, the heating apparatus being employed not only to supply warm water to the drinking pans but to heat a compartment in which the eggs are collected and from which they are shipped so that the eggs are not allowed to become frozen, as it is the intention, by the employment of my improved factory, to deliver the largest possible number of day-old quality eggs.

With these and other objects in view, the invention consists in certain novel features of construction and combinations and arrangements of parts, which will be more fully hereinafter described and pointed out in the claim.

In the accompanying drawings—

Figure 1 is a perspective view of a hen house or building embodying my invention;

Figure 2 is a sectional plan view showing a plurality of sections of the plant or building;

Figure 3 is an enlarged view in vertical transverse section on the line 3—3 of Figure 4;

Figure 4 is a fragmentary view in vertical longitudinal section through the house or plant;

Figure 5 is a view, partly in elevation and partly in section, illustrating a drinking pan and adjacent parts.

1 represents the building as a whole. This building may be of any desired length and may contain any number of rooms or compartments. These rooms or compartments are separated by partitions 2. The compartments in which the hens are located are given reference numerals 3, and I provide a compartment 4, preferably centrally of the building, in which there are no hens.

At least, one wall of the building may be made up of screens 5 with doors 6 and windows 7 for the respective compartments, and hinged covers 8 are provided and adapted to comprise mainly a sheet of fabric which may be swung down into place so as to cover the screens in cold weather but allow proper ventilation. The hinged covers 8 may be swung upwardly and held out of the way by hooks 8' or other securing devices, as shown in Figure 3.

All of the compartments 3 are subdivided by walls 9 having doors or openings 10 therein to give admission to the roosts 11. Suitable nests 12 may be provided in the hen compartments in which the eggs are laid, and any suitable feeding device 13 may also be provided in any compartments.

My invention has more particularly to do with the watering of hens and the heating of an egg-receiving compartment or room. The compartment 4, like the other compartments is divided by a wall 9 and has a door or opening 14. This wall 9 divides the compartment 4 into a relatively large front room, and a smaller room 15 in which a heater 16 is located. This room 15 is preferably lined throughout with any suitable material 17 which constitutes means for preventing the loss of heat. A water tank 18 is provided in the upper portion of room 15 and is connected by circulating pipes 19 with the heater 16 so that the latter not only heats the room 15 but also heats the water in tank 18.

All of the main compartments 3 are provided with drinking pans 20, preferably elevated on blocks or platforms 21, and having suspended above the same conical hoods or covers 22 which are preferably of larger diameter than the pans and which are connected to ropes or other flexible devices 24' secured to the ceiling of the room. These covers 22 are spaced from the top of the pans 20, allowing the hens to have access to the water but preventing the hens perching on the pan or contaminating the water by droppings.

The tank 18 is provided with an outlet pipe 23 down which the water is fed by gravity to pipes 24, extending longitudinally of the building in both directions and through or into all of the hen compartments. These pipes 24 preferably incline upwardly from their point of juncture with the pipe 23, and a drain spout 25 communicates with said pipes at their point of juncture so as to allow the pipes to be drained at will.

I have shown a valve 27 in pipe 23 and valves 28 and 29, respectively, in pipes 24, and through the medium of these valves the flow of water may be regulated or entirely cut off, as may be desired.

The pipes 24 adjacent each pan 20 are formed with discharge spouts 30 which project above the pans 20 whenever the valves 31 in said spouts are open. With my improved apparatus the pans can be easily emptied by removing the pans from their normal position and emptying the water as may be desired, and can be replaced, and all of the pans can be filled from the one source, namely, the tank 18, the flow being by gravity. With such an apparatus water as hot as may be desired is supplied to the drinking pans within the discretion of the operator.

The room 15 above referred to constitutes an important feature of my factory for in this room the freshly laid eggs may be collected and prevented form freezing or chilling, and as it is my desire to furnish day-old eggs which have never been chilled, by the employment of a factory such as above explained, this work is facilitated and superior results are had.

I may also provide doors at 32 in the end walls of the building 1, and I may otherwise construct the building, but I have pointed out what I believe to be the essential features of the factory which enable the proper care of the hens and the handling of the eggs to give the best results.

It will be noted that by reason of the fact that the covers 22 are suspended and adapted to be swung laterally they can be easily moved to one side to allow access to the valves 30 of the discharge spouts 21, and, furthermore, they do not interfere with the ready handling of the pans.

Various slight changes and alterations might be made in the general form of the parts described without departing from my invention and hence I do not limit myself to the precise details set forth but consider myself at liberty to make such slight changes and alterations as fairly fall within the spirit and scope of the appended claim.

I claim:

In combination with a building, partitions dividing the building into independent rooms or compartments, drinking pans in certain of the rooms, a water heating supply tank in one of the rooms, means for heating the tank, outlet pipes communicating with the tank, valves in the pipes controlling the flow of water, valved dischrage spouts communicating with said pipes and discharging into the pans, flexible devices secured in the compartments, and covers for the pans secured to said flexible devices normally located over the pans but capable of being swung aside to permit access to the valved discharge spouts.

OSCAR W. MAPES.